(No Model.) 9 Sheets—Sheet 1.

E. A. FRANKLIN.
CARTRIDGE LOADING MACHINE.

No. 441,616. Patented Nov. 25, 1890.

WITNESSES.

INVENTOR.
Edward A. Franklin
by W. Bakewell Sons
his attorneys (No Model.) 9 Sheets—Sheet 2.
E. A. FRANKLIN.
CARTRIDGE LOADING MACHINE.

No. 441,616. Patented Nov. 25, 1890.

WITNESSES.

INVENTOR.
Edward A. Franklin
by H. Bakewell Sons
his attorneys (No Model.) 9 Sheets—Sheet 3.
E. A. FRANKLIN.
CARTRIDGE LOADING MACHINE.
No. 441,616. Patented Nov. 25, 1890.
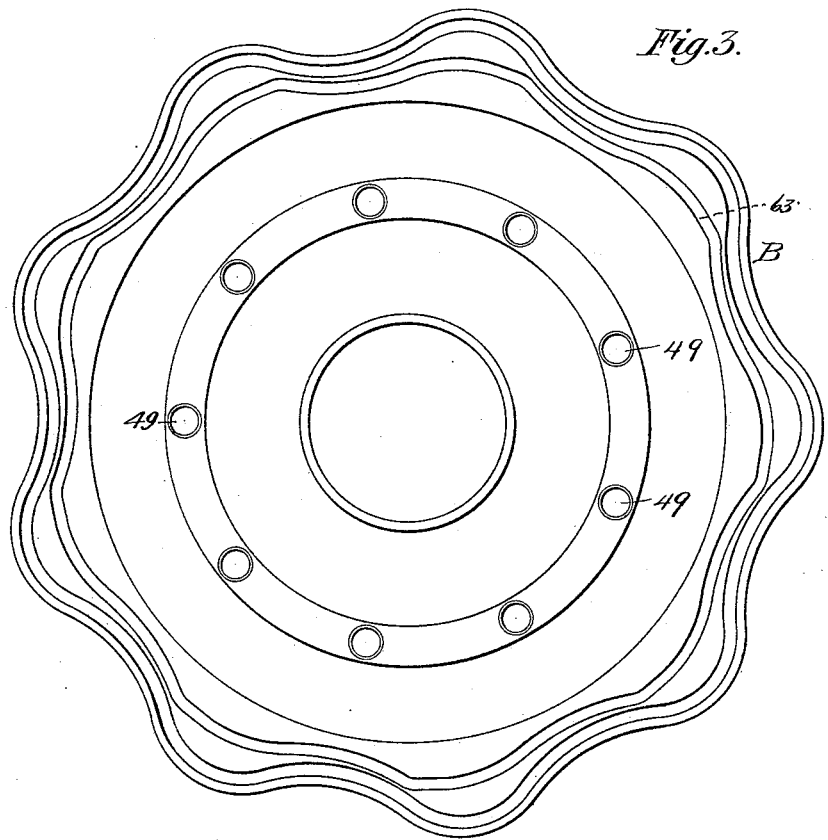
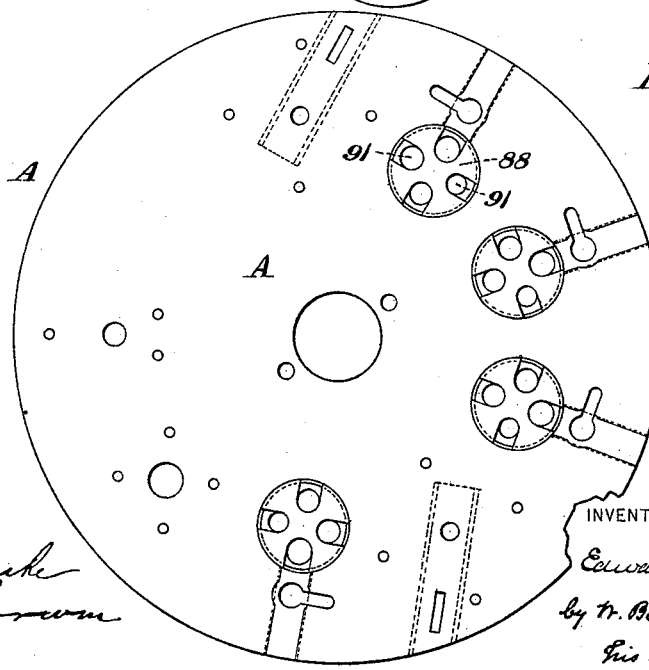

(No Model.) 9 Sheets—Sheet 4.

E. A. FRANKLIN.
CARTRIDGE LOADING MACHINE.

No. 441,616. Patented Nov. 25, 1890.

WITNESSES.
INVENTOR.
Edward A. Franklin
by W. Bakewell Sons
his attorneys (No Model.) 9 Sheets—Sheet 5.

E. A. FRANKLIN.
CARTRIDGE LOADING MACHINE.

No. 441,616. Patented Nov. 25, 1890.

WITNESSES.
INVENTOR.
Edward A. Franklin
by W. Bakewell Sons
his attorneys (No Model.) 9 Sheets—Sheet 7.

E. A. FRANKLIN.
CARTRIDGE LOADING MACHINE.

No. 441,616. Patented Nov. 25, 1890.

WITNESSES.

INVENTOR.
Edward A. Franklin
by W. Bakewell Sons
his attorneys (No Model.) 9 Sheets—Sheet 8.

E. A. FRANKLIN.
CARTRIDGE LOADING MACHINE.

No. 441,616. Patented Nov. 25, 1890.

WITNESSES.
INVENTOR.
Edward A. Franklin
by W. Bakewell Sons
his attorneys (No Model.)
9 Sheets—Sheet 9.
E. A. FRANKLIN.
CARTRIDGE LOADING MACHINE.
No: 441,616.  Patented Nov. 25, 1890.
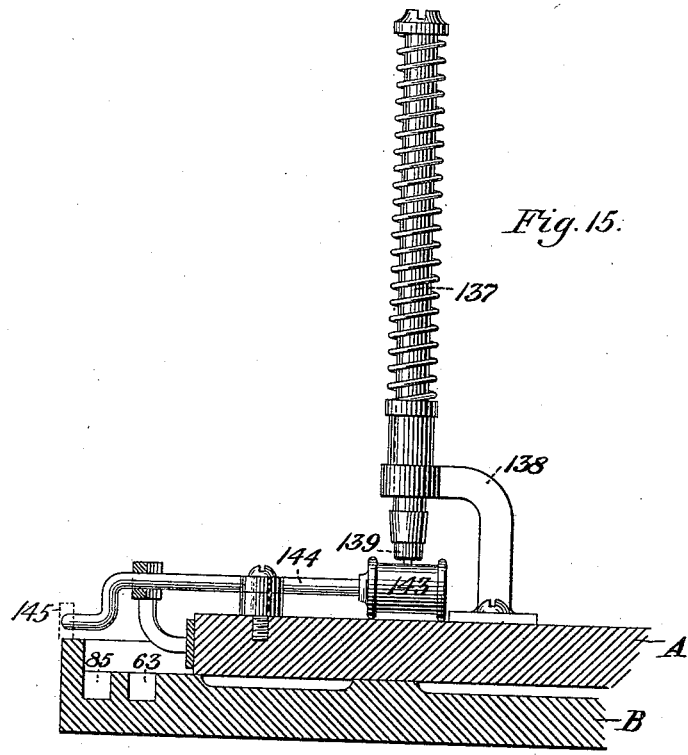
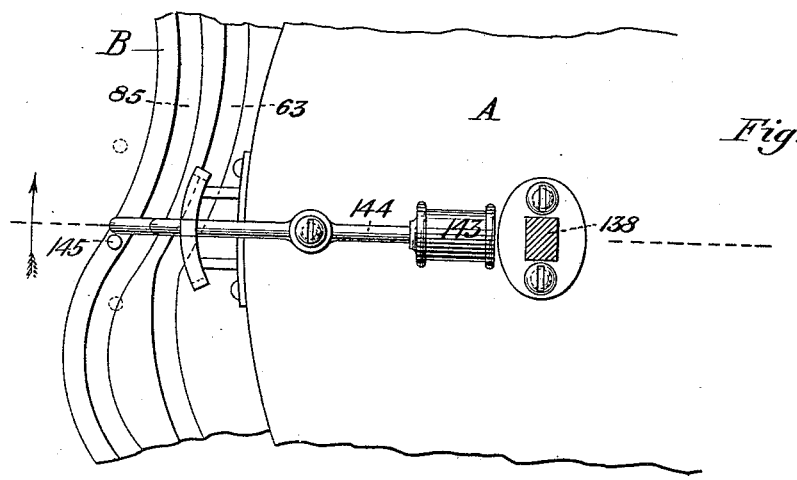
WITNESSES.
INVENTOR.
Edward A. Franklin
by W. Bakewell & Sons
his attorneys

UNITED STATES PATENT OFFICE.

EDWARD A. FRANKLIN, OF BRENHAM, TEXAS, ASSIGNOR TO BAILEY, FARRELL & CO., OF PITTSBURG, PENNSYLVANIA.

CARTRIDGE-LOADING MACHINE.

SPECIFICATION forming part of Letters Patent No. 441,616, dated November 25, 1890.

Application filed June 27, 1890. Serial No. 356,957. (No model.)

*To all whom it may concern:*

Be it known that I, EDWARD A. FRANKLIN, of Brenham, in the county of Washington and State of Texas, have invented a new and useful Improvement in Cartridge-Loading Machines, of which the following is a full, clear, and exact description, reference being had to the accompanying drawings, forming part of this specification, in which—

Figure 1:
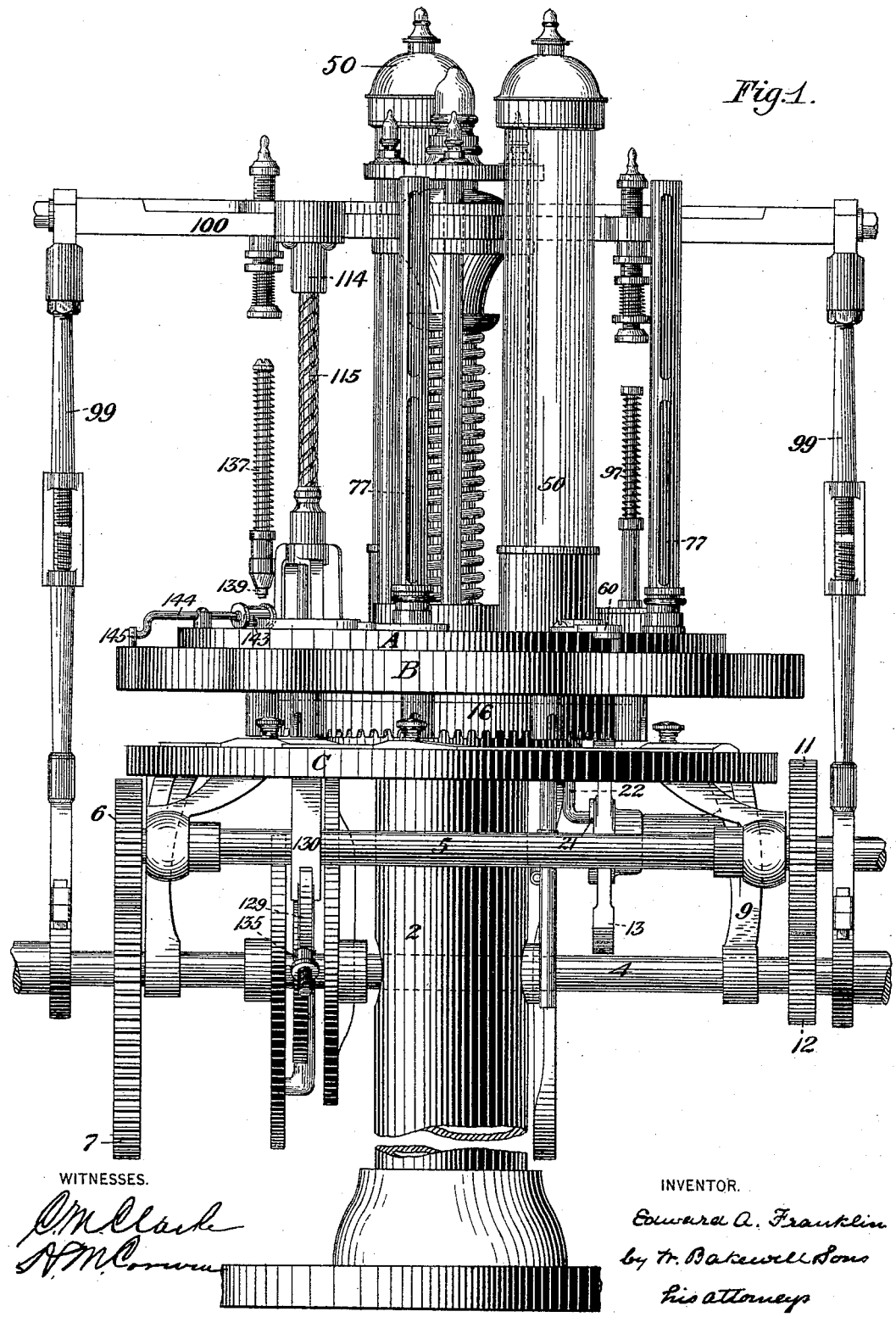
Figure 2:
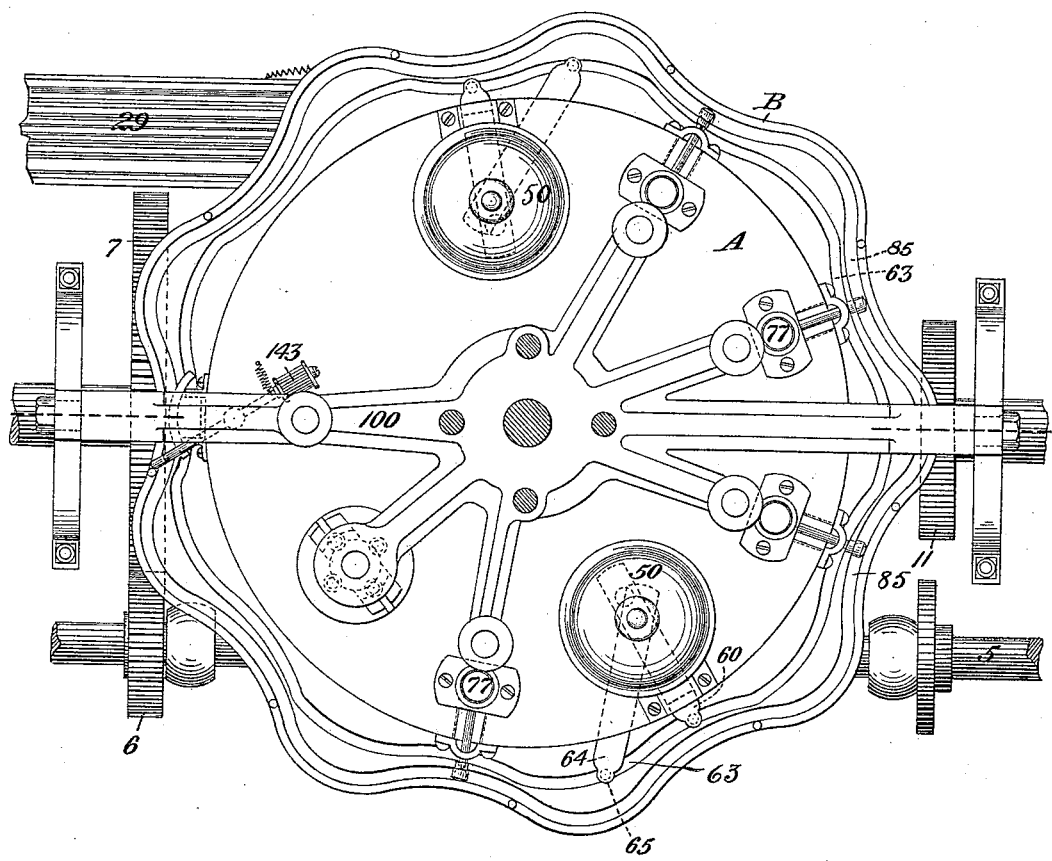
Figure 5:
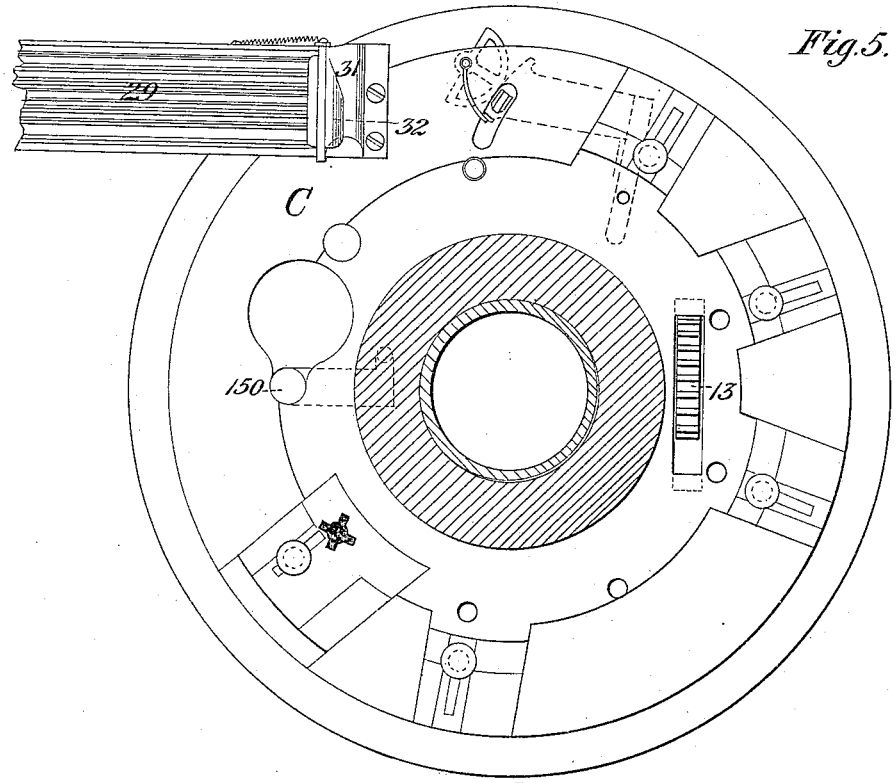
Figure 6:
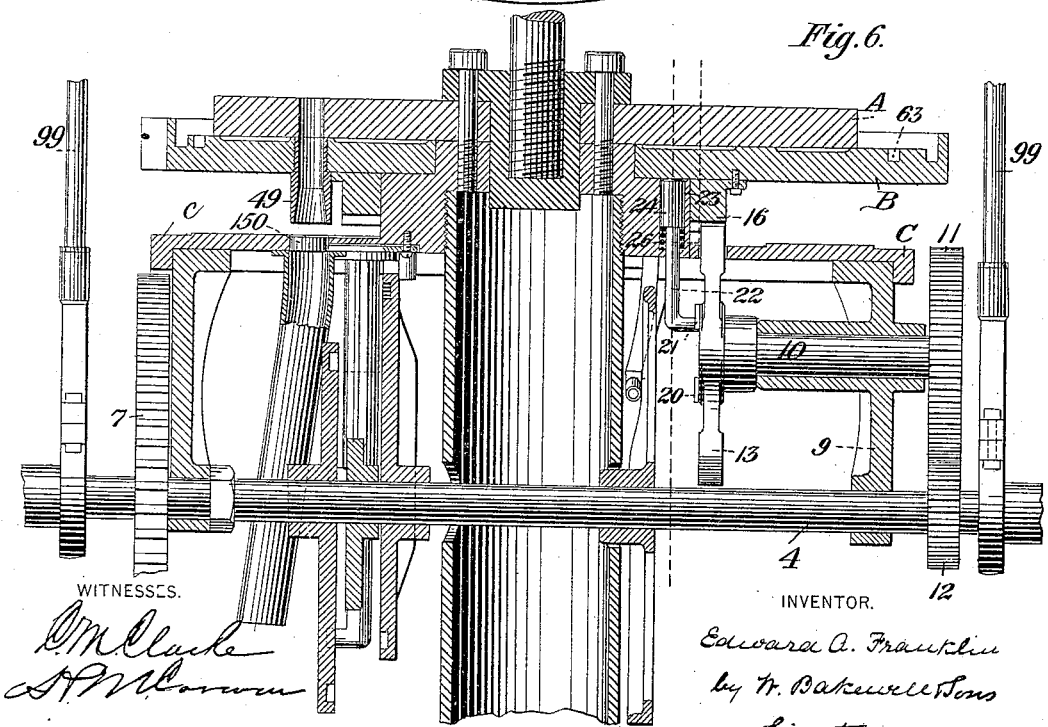
Figure 7:
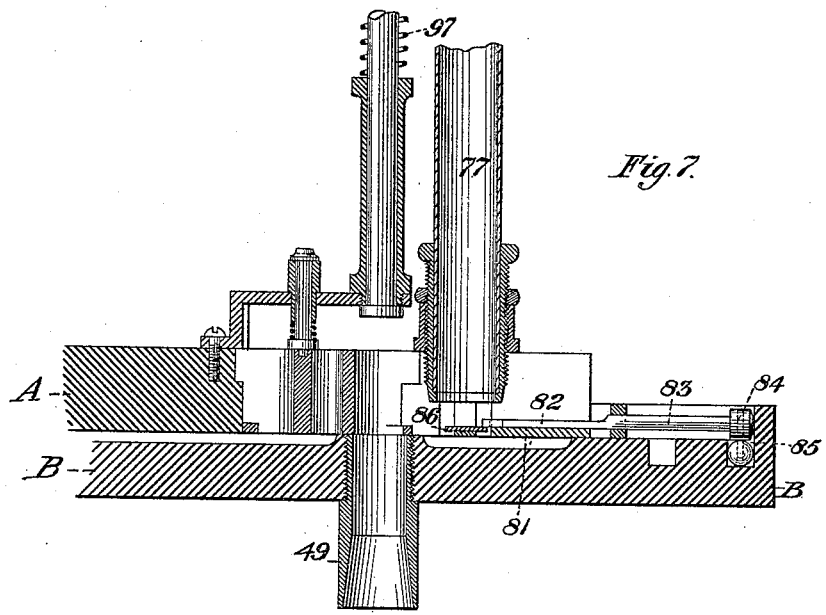
Figure 8:
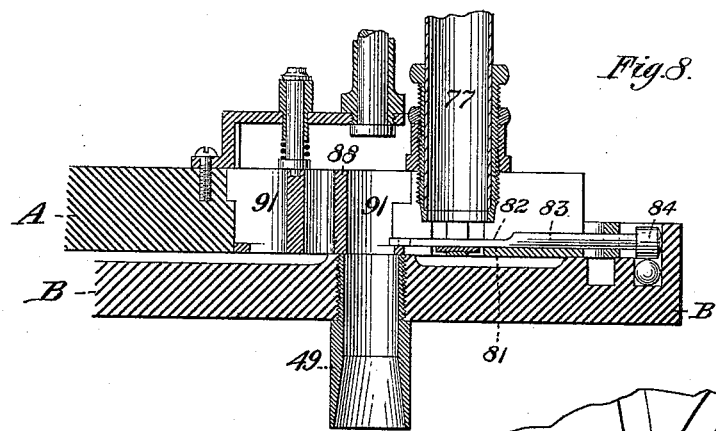
Figure 9:
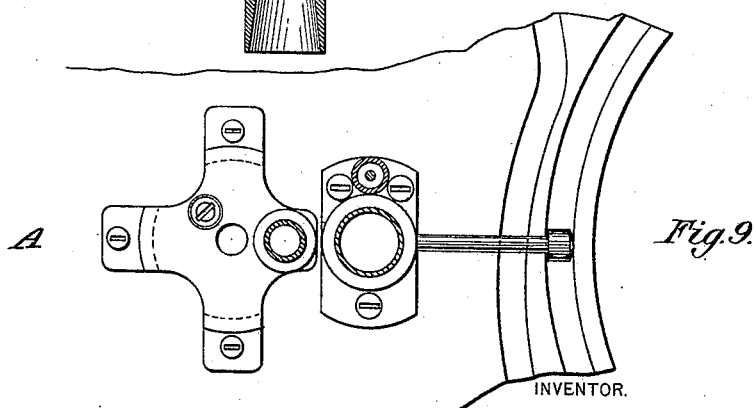
Figure 10:
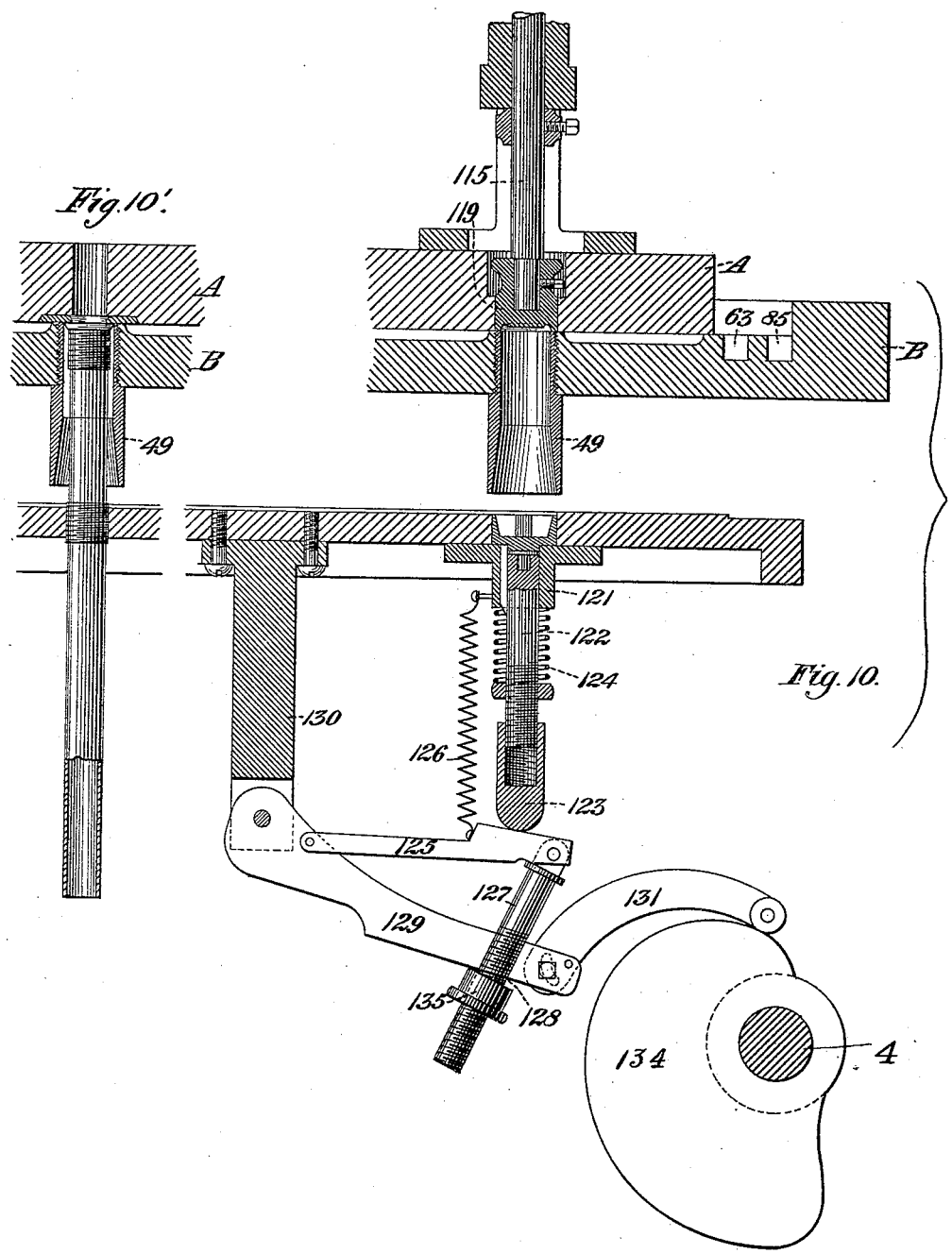
Figure 11:
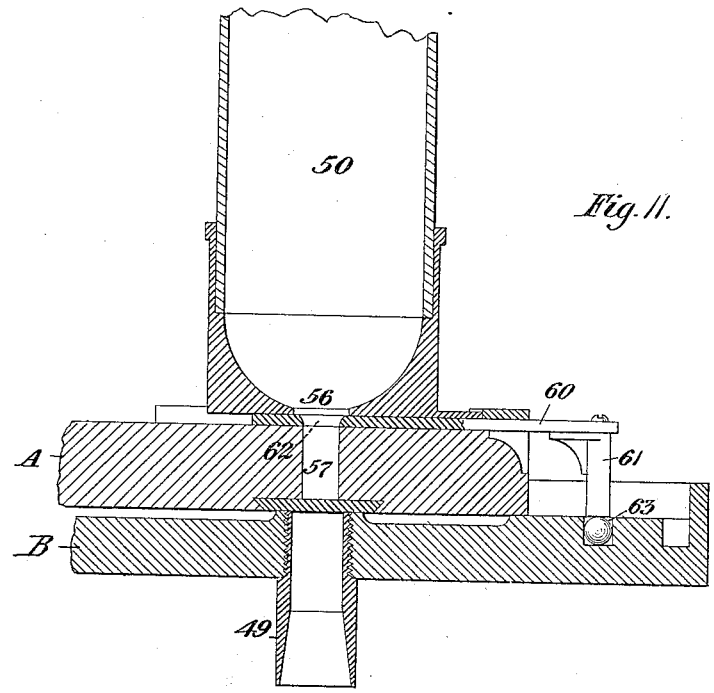
Figure 12:
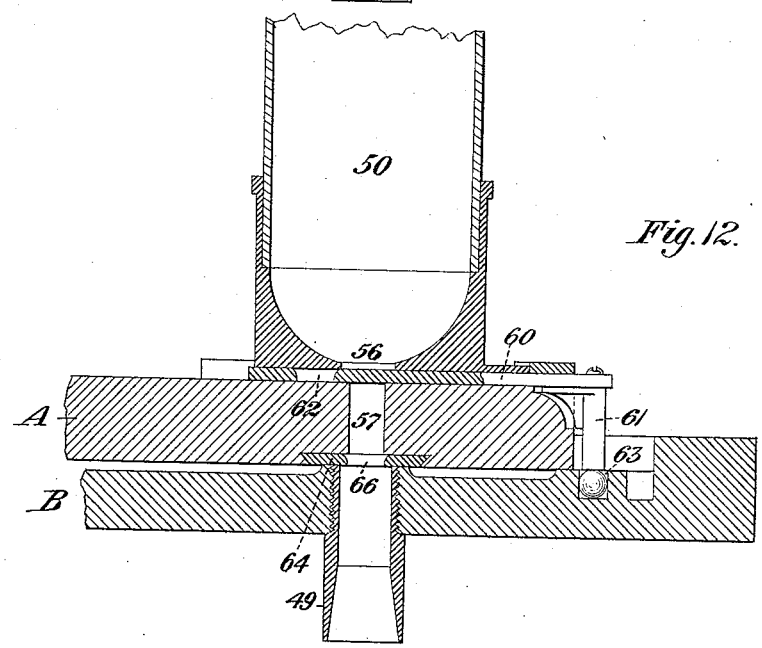
Figure 13:
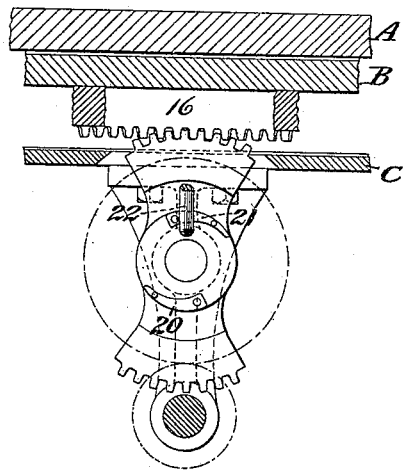
Figure 14:
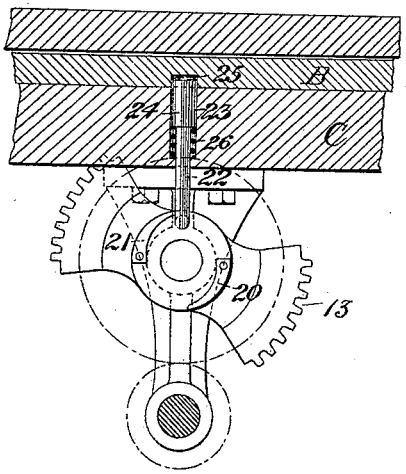
Figure 14:
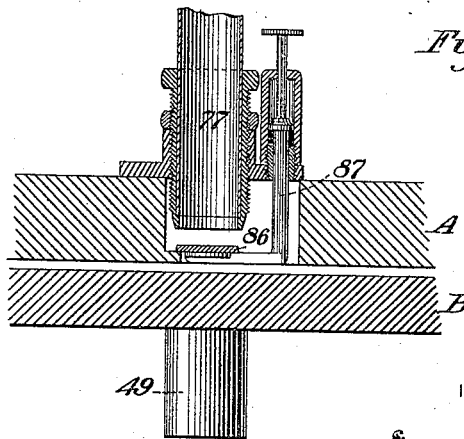

Figure 1 is an elevation of my improved cartridge-loader. Fig. 2 is a plan view of the same. Fig. 3 is a plan view of the middle rotatory plate B. Fig. 4 is a plan view of the top stationary plate A. Fig. 5 is a plan view of the bottom plate C. Fig. 6 is a vertical sectional view. Fig. 7 is a detached vertical sectional view showing the wad-feeder in position to feed the wad. Fig. 8 is a like view of the same in the position assumed as the wad is fed. Fig. 9 is a plan view of the same. Fig. 10 is a vertical sectional view showing the crimper mechanism. Fig. 10' is a vertical sectional view showing means of withdrawing the contents of the hoppers. Figs. 11 and 12 are vertical sectional views showing the powder-hopper with the slide in open and closed positions. Figs. 13 and 14 are elevations, partially in section, showing the mutilated wheel by means of which an intermittent movement is imparted to the plate B. Fig. 14' is a vertical sectional view showing the wad-disk. Fig. 15 is an elevation of the stamping-plunger and the inking-roller. Fig. 16 is a plan view of the inking-roller as connected with the plates A and B.

Like symbols of reference indicate like parts in each view.

My invention relates to an improvement in cartridge-loaders adapted to load cartridge-shells automatically, the machine being operated by suitable power.

It consists in improved power mechanism and devices which may be arranged and combined with the loading mechanism of a machine cartridge-loader in which the empty cartridge-shells are fed into cartridge-holders connected with a revolving plate which carries them, first, to a powder-hopper, where a charge of powder is fed into the shell, (the plate being held stationary during the feeding operation, while at the same time another shell is fed to the next cartridge-holder in the plate;) second, to a wad-hopper, and then to a shot-hopper and succeeding wad hopper or hoppers, to a crimper and printing-stamp, and, finally, the loaded cartridge is discharged from the machine; and it has for its object the regular and certain movement of the several parts of the machine with the least possible jar and friction.

I will now describe my improvement as applied to the cartridge-loader invented by me and described in Letters Patent No. 396,359, dated January 15, 1889, which is provided with nine cartridge-holders situate in a revolving plate, at each one-ninth revolution of which a shell is delivered to one of the shell-holders, a charge of powder is fed into one of the other shells, the wads and shot are fed into their respective shells, a shell is crimped and stamped, and a loaded cartridge is delivered from the machine.

In Fig. 1 of the drawings, 2 represents the base or pedestal of the machine, secured to the upper portion of which is the bed-plate C. Mounted in the pedestal 2 is the main power-shaft 4, to which power is applied by the power-shaft 5 and gear-wheels 6 and 7. Mounted on the pedestal 2 is the revolving plate B, to which power is applied as follows: Secured to the bed-plate is a journal-bracket 9, in which is mounted the short shaft 10, (see Fig. 6,) having the gear-wheel 11, which meshes with the gear-wheel 12, which is connected with the shaft 4. At the inner end of the shaft 10 is a mutilated gear wheel or pinion 13, which is keyed to the shaft. (See Fig. 6.) On the base of the revolving plate B (see Figs. 1 and 13) is a projecting annular rack 16, which is provided with teeth, with which the teeth of the pinion 13 mesh, so that as the pinion revolves its teeth shall engage with the teeth of the rack 16 and impart an intermittent rotary motion to the plate B. The number of teeth on the rack 16 should be in proportion to the number of shell-holders contained in the plate and the distance of movement required. On the sides of the pinion 13 are two cams 20 21, Figs. 13 and 14, which engage with the bent end of a locking-pin 22, which is mounted in a suitable box 23, fixed to the bed-plate C, the pin being provided with a locking-head 24, which is adapted to engage with slots 25 in the lower face of the revolving plate B. (See Fig. 14.) Within the box 23, below the locking-head 24, is a spiral spring 26, the force of which is exerted upward, so as to retain the end of the locking-head within the slots 25. These slots are situate so that after the plate B has been given one-ninth revolution by the pinion 13 one of the slots 25 is brought directly over the head of the locking-pin. When, however, the next stroke of the pinion 13 is about to occur, one of the cams 20 21 engages with the bent end of the locking-pin 22 and, depressing the same, draws the head of the lock-pin and draws the pin 22 from the slot, thereby permitting the revolving plate B to perform its one-ninth revolution.

Secured to the bed-plate C (see Fig. 5) is the shell-hopper 29, at the lower end of which is a curved delivering-leaf 31 and a retaining-guard 32, which, operated by suitable mechanism, (not shown in this application, but fully described in Letters Patent No. 396,359,) deliver the empty shells automatically and intermittently to a shell-feeder, which in turn delivers the shells to the shell-holders 49, (see Figs. 3 and 6,) which are composed of cylindrical tubes, which are attached to and extend down from a series of apertures situate in the revolving plate B and concentric with the periphery thereof toward the bed-plate C. During the operation of delivering the shell from the shell-hopper to the feeder and from the feeder to the shell-holder the plate B is locked by the locking-pin 22 (see Fig. 14) in the manner already described. By the next one-ninth revolution of the plate B the shell in the holder 49 (the head of the shell resting on the bed-plate C) is carried to a point directly under the powder-hopper 50, which is mounted on the top fixed plate A.

The powder and shot hoppers (see Figs. 1 and 2) may be composed of cylindrical glass jars fitting in a metal socket, which socket is secured to a collar or bracket on the plate A, in which plate directly below the powder and shot hoppers is an opening 56. (See Figs. 11 and 12.) Below the powder and shot hoppers and above and covering the top of the openings 56 in the plate A are slides 60, arranged to slide longitudinally in suitable ways, and they are provided with openings 62, similar to the openings 56. These slides extend beyond the periphery of the plate A, and at their outer end are provided with arms 61, which extend down into an annular curved cam-slot 63, formed in the upper face of the revolving plate B, (see Figs. 11, 12, and 2,) so that as the plate B revolves the cam-surfaces of the slot 63 will impart a positive reciprocating movement to the slides, whereby the openings 62 are brought beneath the vents of the hoppers and over the openings 56 and then pushed back from the same, so as to close and open the vents and openings 56 and permit a charge of powder and shot to pass from the hoppers into the chamber 57.

Situate in slots or ways formed in the lower face of the plate A under the chamber 57 are slides 64, having openings 66, (see Fig. 12,) which slides extend at an angle with the slides 60 beyond the periphery of the plate A, (see Fig. 2,) and at their outer ends are provided with arms at 65, which are similar to the arms 61 and fit in the curved cam-slot 63. It will be noticed (see Fig. 2) that the slides 64 are connected with the slot 63 at a point which will push the slides 60 in, so as to close the vents of the hoppers before the slides 65 are drawn out or opened. Owing to this arrangement during the rotation of the plate B the slide 60 is opened, permitting a charge of powder to fill the chamber 57 in the plate A (see Fig. 11) and then closed, after which the slide 64 is opened, permitting the charge of powder or shot to pass from the chamber 57 into the shell contained in the shell-holder of the plate B, (see Fig. 12,) and as all these movements are positive it is impossible for the slide 64 to open before the slide 60 is closed, and vice versa. After the cartridge-shell has received its powder, at the next partial movement of the plate B the shell containing the powder is brought opposite the wad-hopper 77. In the plate A below the wad-hopper is a recess or way 81, (see Fig. 7,) within which a slide 82 is fitted, (see Figs. 7 and 8,) which slide is provided with an arm 83, the outer end of which is connected with a traveler 84, situate in an annular curved cam slot or way 85, formed in the upper face of the plate B outside of the periphery of the plate A, (see Fig. 2,) so that a reciprocating movement is imparted to the slide 82 similar to that of the slides 60 and 64. Situate directly below the wad-hopper 77 is a movable disk 86, connected with an adjusting hand-rod 87, (see Fig. 14',) by means of which the disk may be raised or lowered, according to the thickness of wads to be loaded. Beyond the wad-hopper 77 at the inner end of the slot 81 is a circular plate 88, (shown in Fig. 4,) which is provided with two or more openings 91 of different sizes, to accommodate different-sized wads, so that by turning the plate any one of the openings may be brought opposite the end of the way or slot 81, directly beneath the wad-plunger and over the opening in the plate A, which leads to the cartridge-shell holder in the plate B. By the rotation of the plate B the slide 82 is pushed in and carries the lowest wad of the column of wads along the slot 81 to the opening 91 beneath the wad-plunger 93. (See Fig. 8.) This wad-plunger consists of a vertically-reciprocating rod provided with a spring 97, Fig. 1, and it is operated by a spring-hammer connected with the cross-head 100, which is connected with the shaft 4 by actuating-arms 99. When the wad has been carried from the wad-hopper 77 directly under the wad-plunger 93, the cross-bar 100, descending, forces the wad down through the opening 91 into the cartridge-shell holder in the plate B on top of the powder in the shell.

Where the machine is designed to load more than one wad on the powder, two or more wad-hoppers may be arranged between the powder and shot hopper. After the wad or wads have been placed in the shell, as described, the revolution of the plate B carries the shell-holder beneath the shot-hopper, and the shot is placed in the shell in the same manner as the powder, and farther partial revolution of the plate carries the shell to another wad-hopper, where a wad is placed on the shot. By the next movement of the plate B the shell is brought under the crimper, which is shown in detail in Fig. 10.

Connected with the cross-head 100 (see Fig. 1) is a worm-nut 114, with the worm of which a worm-rod 115 engages, the rod passing through the nut. At the lower end of the rod 115 is the crimping-head 119, (see Fig. 10,) which fits in an opening in the plate A. After the loaded shell has received its final wad it is brought by the rotation of the plate B directly under the crimper-head. At this point in the bed-plate C is a guide-cylinder 121, within which is the crimping-plunger 122, at the lower end of which is the threaded thimble or collar 123, between which and the socket 121 is a nut and spiral spring 124. Below the thimble 123 is a lever-arm 125, which is connected with the socket 121 by a spiral spring 126. One end of the arm 125 is pivoted to the arm 129 and the other end to the arm 127, which arm is slotted at 128, and through which slot a lever-arm 129 passes, one end of which is secured to the hanger 130, while the other end is secured to the curved cam-yoke 131. On the end of the arm 127 below the lever-arm 129 is a thumb-nut 135, by means of which the distance between the arms 125 and 129 may be adjusted. The cam-yoke 131 engages with the cam 134, which is keyed to the main shaft 4. By the movement of the cam 134 the plunger 122 is elevated, which lifts the cartridge against the crimper-head 119, which head is caused to revolve by the worm-nut on the worm-rod 115 as the cross-head 100 descends. After the shell has been loaded and crimped it is brought by the next partial movement of the revolving plate B under the wad-stamper, (see Fig. 15,) which consists of a spring-plunger 137, mounted in a bracket 138, which is secured to the plate A. On the end of the plunger 137 is a figured stamp 139, on the face of which are type or figures denoting the number of the shot with which the shell is loaded. This plunger is operated by a spring-hammer similar in construction and operation to those connected with the wad-plungers. Situate adjacent to the figured face of the stamping-plunger is an inking-roller 143, which is secured to the plate A by means of an arm 144, which is pivoted to the plate, and one end of which extends beyond the periphery of the plate A and crosses the path of the pins 145 on the rotating plate B, (see Fig. 16,) so that as the plate B revolves the pins engaging with the arm 144 move the inking-roller across the face of the printing-stamp by a positive force, and when the pins have passed from off the end of the arm the roller is drawn back to its original position. The stamping-plunger then descends and stamps the cartridge, which is supported by the disk 150, (see Fig. 6,) and the cartridge is then delivered from the machine, the disk 150 being moved to one side.

The advantages of my improvement are that a positive and exact movement is imparted to the loading mechanism and rotating plate and jarring and irregular movement of the parts are prevented.

Although I have described my improvement as applied to a power cartridge-loading machine, I do not desire to limit it thereto, as it may be applied to other cartridge-loaders having a fixed plate or support and a rotating plate or shell-holder or to a cartridge loader having a fixed support and a reciprocating plate, arm, or shell-holder, moving either in a straight line or on the arc of a circle.

Having thus described my invention, what I claim, and desire to secure by Letters Patent, is—

1. In a cartridge-loader having powder, wad, and shot hoppers, the combination of a rotatory plate mounted on a fixed standard or support, said plate being provided with one or more cartridge-holders, a rack formed on the face of the plate, a mutilated pinion journaled on the fixed support and arranged to gear with the rack, and operating mechanism for operating the pinion so that a positive intermittent movement may be imparted to the plate, substantially as and for the purpose specified.

2. In a cartridge-loader, the combination of a movable plate mounted on a suitable standard or support and having curved cam-grooves on its upper face and having one or more cartridge-holders, a fixed plate situate on the standard above the movable plate, powder, wad, and shot hoppers mounted on the fixed plate, feed-slides mounted on the fixed plate and arranged to engage with the cam-grooves, and means for operating said parts, substantially as and for the purpose specified.

3. In a cartridge-loader, the combination of a fixed plate having a printing-stamp and a pivoted inking-roller with a movable plate having projecting pins adapted to engage with the arm of the roller, and also provided with cartridge-holders, whereby the successive cartridges are brought under the printing-stamp, and means for operating said movable plate, substantially as and for the purposes specified.

4. In a cartridge-loading machine, the combination of a movable plate mounted on a suitable support and provided with one or more cartridge-holders, a rack formed on the face of the plate, a mutilated pinion journaled to the support and arranged to gear with the rack, a locking-pin mounted on the support and arranged to engage with a locking-slot in the plate, a cam or cams formed on the side of the pinion and arranged to engage with the locking-pin, and means for imparting power to the pinion, substantially as and for the purposes specified.

5. In a cartridge-loader, the combination of a hopper mounted on a fixed plate, a charging or measuring chamber situate at the vent of the hopper, a slide separating the hopper from the charging-chamber, a slide at the vent of the charging-chamber, a movable plate situate below the fixed plate and provided with one or more cartridge-holders arranged to be brought in communication with the vent of the charging-chamber by the movement of the plate, a cam groove or grooves formed in the face of the movable plate, with which the slides are arranged to engage so as to be operated alternately by a positive movement in both directions by the movement of the plate, and means for imparting movement to the movable plate, substantially as and for the purposes specified.

In testimony whereof I have hereunto set my hand this 1st day of July, A. D. 1889.

EDWARD A. FRANKLIN.

Witnesses:
W. B. CORWIN,
H. L. GILL.